J. HORMBY.
SHAFT COUPLING.
APPLICATION FILED JUNE 16, 1910.
987,878.
Patented Mar. 28, 1911.
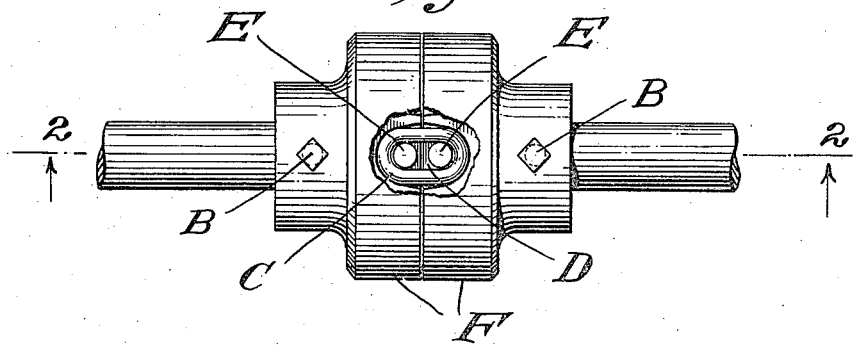
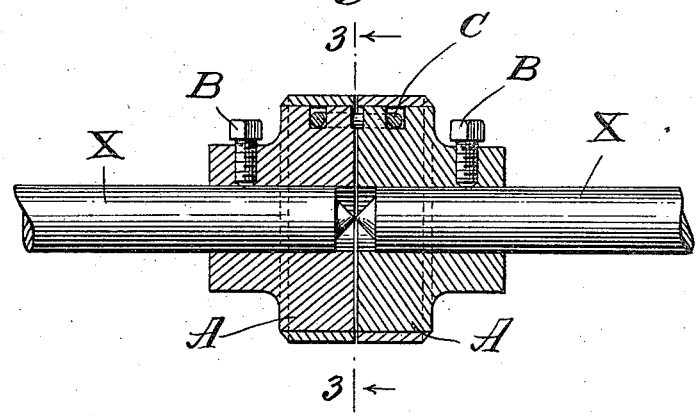
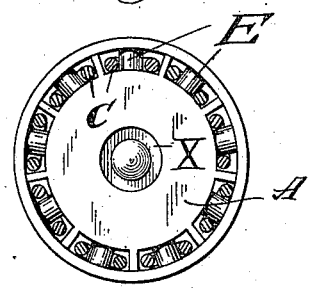
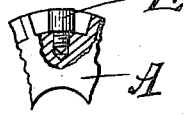
Attest:
Stephen S. Newton
Alan C. McDonnell
Inventor:
John Hormby
by William R. Baird
his Atty.
THE NORRIS PETERS CO., WASHINGTON, D. C.

UNITED STATES PATENT OFFICE.

JOHN HORMBY, OF SPRINGFIELD, MASSACHUSETTS.

SHAFT-COUPLING.

987,878.   Specification of Letters Patent.   Patented Mar. 28, 1911.

Application filed June 16, 1910.   Serial No. 567,283.

*To all whom it may concern:*

Be it known that I, JOHN HORMBY, a citizen of the United States, residing at Springfield, in the county of Hampden and State of Massachusetts, have invented certain new and useful Improvements in Shaft-Couplings, of which the following is a specification.

The invention relates to improvements in means for coupling sections of rotary shafts and particularly to means designed to compensate for the departure from alinement due to conditions incident to the setting-up and operation of the machines connected with such shafts, and its objects are, among others, to produce a simple, effective and durable coupling of the character above referred to and to reduce the cost of workmanship and materials incident to the manufacture and application of the same; to provide for the renewal of the parts of the coupling when worn or broken and to prevent such wear or breakage from interfering with the efficiency of the device or interrupting its operation.

To these ends it consists in the construction, combination and arrangement of parts hereinafter described and claimed and illustrated in the accompanying drawings.

In the said drawings, Figure 1 is a side elevation of a shaft coupling embodying the improvements with a portion of the outer casing broken away to expose the inner parts to view. Fig. 2 is a horizontal longitudinal section on the line 2—2 of Fig. 1, looking in the direction indicated by the arrows, the shaft sections being shown in full elevation. Fig. 3 is a vertical cross-section on the line 3—3 on Fig. 2 looking in the direction indicated by the arrows. Fig. 4 is a detail of a modification.

It is well understood by those who are experienced in the installation and operation of power and other machinery that in many instances it is absolutely essential that the shaft connecting two pieces of machinery—as, for instance, a turbine steam engine and an electric generator—shall be made in two sections. The machines must be positioned on their beds separately and adjusted in such a way that the section of shaft connected to each one will be in alinement with the section of shaft connected to the other. This is an extremely careful and difficult task, especially with heavy machines, and it is almost impossible to so mount and adjust the machines that a perfect alinement of the shaft sections will be attained. Again, certain variations in the conditions under which the machines are operated, as for instance, variations in the speed, the place in which the machine is mounted, the bearings and the resistance of the work tend to alter the relative positions of the machines slightly after a short period of operation. All these causes lead to a more or less material departure from alinement in the machines and consequent and corresponding wear and loss of speed and power, and it is for the purpose of compensating for this departure from alinement and thus preventing the undesirable results resulting therefrom that the present improvements are designed.

The coupling is made in two sections A, preferably of identical construction, each one secured to a shaft section X by means of a spline and key through the hub of each coupler section and engaging the shaft. The two sections are placed in abutting position on the ends of their respective shaft sections and united by the links C lying in a socket or recess D formed of complemental depressions in the periphery of each hub section, one half of each link lying in the recess of one coupler section and the other half in the like recess of the other. A series of studs E are provided, one for each link socket and situate centrally therein, so that each link surrounds two opposing studs and extends across between the coupler sections to unite the same. The periphery of each hub section is preferably smooth and when the two sections are placed together, their peripheries form a continuous cylindrical surface, over which slide the casing sections F which serve the purpose of preventing the links falling out of their sockets and protecting the parts from dust and dirt.

It will be apparent from the foregoing description that the construction set forth provides a coupling which will have the desired degree of flexibility combined with the greatest strength and durability. Moreover in the arrangement disclosed, the links constitute ties that positively secure the shaft sections against longitudinal separation. The links may be removed and renewed when worn, and if desired the studs may be screw-tapped in the body of the section (as shown in Fig. 4) and removed and replaced by others when worn. Various other modifications of the details of construction may also be made without departing from the spirit of the invention.

What I claim as new is:—

1. The combination with shaft sections located end to end and rotating on substantially a common axis, of a plurality of independent links flexibly connecting the adjacent ends of the shaft sections and having pivotal connections at their ends with both, forming ties that positively secure the sections against longitudinal separation, said links being located on different sides of the shaft sections, bridging the joint between them and having their pivot axes disposed substantially radially to the axis of rotation of the shafts.

2. The combination with coupling sections located end to end and having substantially alined axes of rotation, of outstanding pairs of studs carried by the sections, the studs of each pair being respectively located on the different sections, and a link surrounding each pair of studs and bridging the joint between the sections.

3. The combination with coupling sections located end to end and having substantially alined axes of rotation, of outstanding pairs of studs carried by the sections, the studs of each pair being respectively located on the different sections, a link detachably engaged over each pair of studs, and removable over the outer ends thereof, said links bridging the joint between the sections, and means surrounding the outer ends of the studs for retaining the links thereon.

4. The combination with coupling sections located end to end and provided in their peripheries with sockets and radially-disposed studs arranged in the sockets, of links bridging the joints between the sections and having their end portions arranged in the sockets and surrounding the studs, and casing bands surrounding the coupling sections and covering the sockets and the ends of the studs to retain the links thereon.

In testimony whereof I affix my signature in presence of two witnesses.

JOHN HORMBY.

Witnesses:
E. J. BOUDRER,
C. L. ELWELL.

---

Copies of this patent may be obtained for five cents each, by addressing the "Commissioner of Patents, Washington, D. C."